United States Patent
Dolazza et al.

[11] Patent Number: 5,905,692
[45] Date of Patent: May 18, 1999

[54] DIGITAL ULTRASOUND BEAMFORMER

[75] Inventors: Enrico Dolazza, Boston; Michael Lachmayr, Boxford; Louis R. Poulo, Andover, all of Mass.

[73] Assignee: Analogic Corporation, Peabody, Mass.

[21] Appl. No.: 09/001,452

[22] Filed: Dec. 31, 1997

[51] Int. Cl.[6] .............................. G01S 7/52; G01N 29/00; A61B 8/00
[52] U.S. Cl. .......................... 367/123; 367/103; 600/447; 73/626
[58] Field of Search ..................... 367/103, 119, 367/123; 73/625, 626; 600/447

[56] References Cited

U.S. PATENT DOCUMENTS

| | | | |
|---|---|---|---|
| 4,290,310 | 9/1981 | Anderson | 73/626 |
| 4,420,825 | 12/1983 | Maynard et al. | 367/123 |
| 4,622,634 | 11/1986 | Fidel | 364/414 |
| 4,886,069 | 12/1989 | O'Donnell | 128/661.01 |
| 4,983,970 | 1/1991 | O'Donnell et al. | 341/122 |
| 5,088,496 | 2/1992 | Bernard | 128/660.07 |
| 5,217,017 | 6/1993 | Matsushima | 128/661.01 |
| 5,268,877 | 12/1993 | Odell | 367/103 |
| 5,269,307 | 12/1993 | Fife et al. | 128/661.06 |
| 5,345,426 | 9/1994 | Lipschutz | 367/103 |
| 5,406,949 | 4/1995 | Yao et al. | 128/662.01 |
| 5,457,996 | 10/1995 | Kondo et al. | 73/625 |
| 5,469,851 | 11/1995 | Lipschutz | 128/661.01 |
| 5,477,859 | 12/1995 | Engeler | 128/661.01 |

*Primary Examiner*—Ian J. Lobo
*Attorney, Agent, or Firm*—Lappin & Kusmer LLP

[57] ABSTRACT

An array transducer ultrasound beamformer includes a plurality of processing channels, one for each active element of the transducer array. Each channel includes a digitizing unit for converting the received signal to digital samples and a time multiplexed delay unit for producing a primary stream of delayed TDM samples corresponding to one or more beams. Within each channel, the primary stream of delayed TDM samples is demultiplexed in order to separate the stream in a plurality of secondary streams of delayed TDM samples, wherein each of the secondary streams corresponds to a portion of a beam or a single beam.

18 Claims, 7 Drawing Sheets

FIG. 4a
1 Beam

FIG. 4b
2 Beams

FIG. 4c
4 Beams

DIGITAL ULTRASOUND BEAMFORMER

CROSS-REFERENCE TO RELATED APPLICATIONS

Not Applicable

STATEMENT REGARDING FEDERALLY SPONSORED RESEARCH

Not Applicable

REFERENCE TO MICROFICHE APPENDIX

Not Applicable

FIELD OF THE INVENTION

The present invention relates to ultrasound imaging systems which utilize linear array beam steering and focusing, and more particularly, to ultrasound imaging systems which receive and process multiple beams simultaneously through the use of Time Division Multiplexing (TDM).

BACKGROUND OF THE INVENTION

In an array transducer ultrasound imaging system, the ultrasound transducer includes an array of active transducer elements. To support this array of transducer elements, the system includes a plurality of parallel channels, wherein each channel includes a transmitter and a receiver connected to one of the active transducer elements in the array. The transducer elements are arranged in a regularly spaced array. Each transmitter outputs an ultrasound pulse through a transducer element into an object to be imaged, typically the human body. The transmitted ultrasound energy is steered and focused by applying appropriate delays to the pulses transmitted by each element in the array so that the transmitted energy arrives at a desired point in phase, thus the energy adds constructively at that point. This causes a portion of the pulse to be reflected back to the transducer array by various structures and tissues in the body.

Steering and focusing of the received ultrasound energy is effected in similar manner. The ultrasound energy reflected from the structures or tissues arrives at the different array elements at different times according to the distance from the structure. The received signals are amplified, delayed and then summed in a receive beamformer. The delay for each element is selected such that the reflected energy received by each transducer from the desired point is input into the summing unit in phase (at the same time), thus creating a received beam that is focused at the desired point. The delays may be varied dynamically so as to focus the beam at progressively increasing depths, or ranges, as the ultrasound energy is received. The transmitted beam can be scanned in a region of the body, and the signals generated by the beamformer are processed to produce an image of the region.

One important consideration in ultrasound imaging is the image sequence rate, or scan rate. A pulse of ultrasonic energy directed from the ultrasonic imaging system to the region of interest has a finite round-trip propagation time. The depth of the region of interest and the propagation velocity through the tissue are factors which determine the round-trip propagation time. For reasons known in the art, a subsequent pulse of ultrasonic energy cannot be transmitted until energy returning from a previous pulse has been received, so the round-trip propagation time sets a limit on the maximum pulse rate. If only one point of interest is isolated per pulse, then the round-trip propagation time also sets a limit on the system's maximum scan rate. The scan rate is particularly important for color Doppler imaging of blood flow and for producing images with higher lateral resolution at a high image rate.

One approach to increasing the scan rate is to receive beams from more than one direction at the same time within the spread of the single transmitted pattern. Another approach is to simultaneously transmit sound patterns along directions widely spaced and to simultaneously receive beams from one or more directions within the spread of each transmitted pattern. In prior art systems, multiple receive beams are formed by multiple beamformers operating in parallel. However, because of the large amount of circuitry required for each beamformer, this approach is expensive and must be used only when each one of the simultaneously received beams fully utilizes the forming means of the beamformer.

Figure 1:
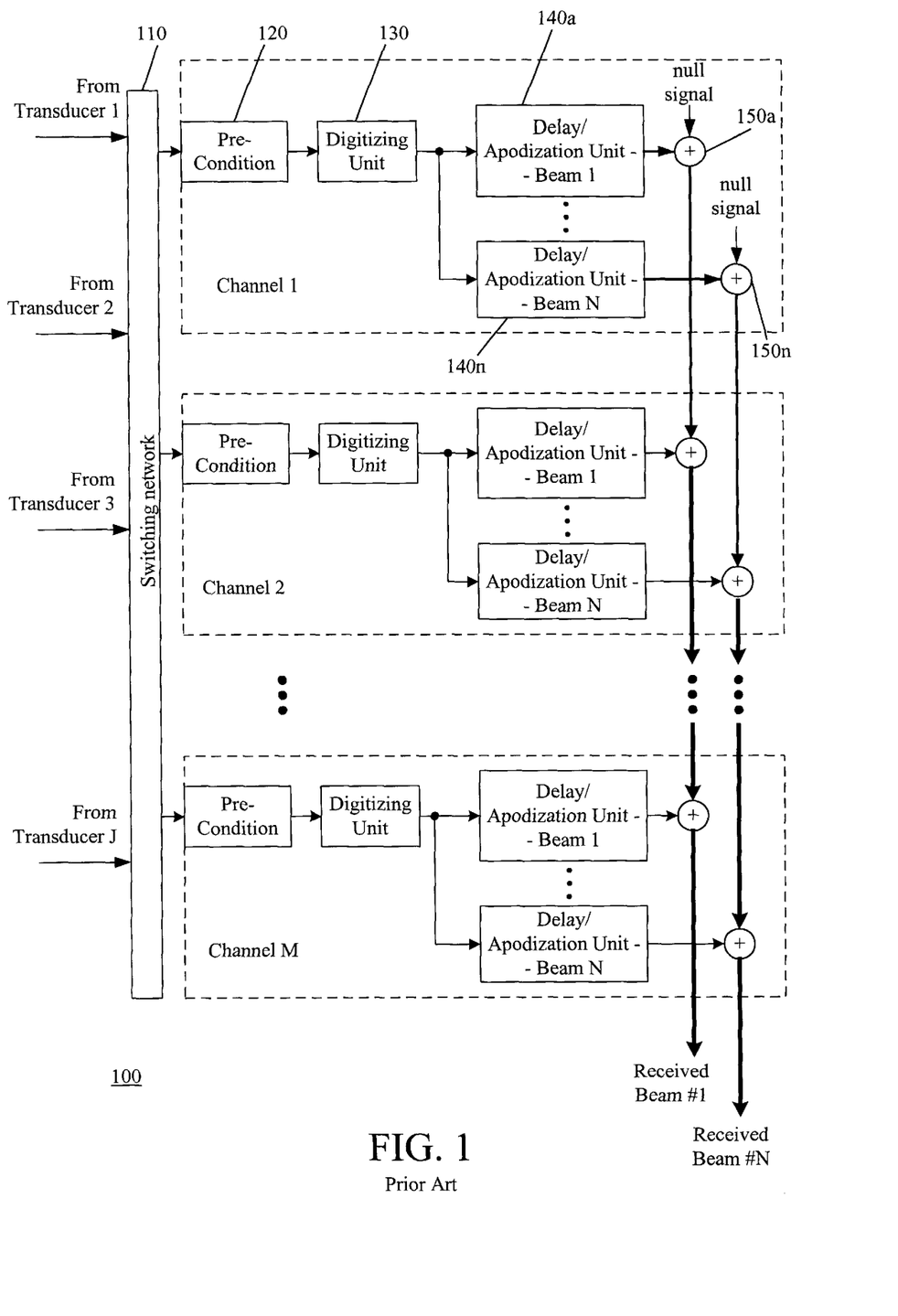
FIG. 1 is a diagrammatic view of one prior art ultrasound beamformer for use in an ultrasound imaging system.

FIG. 1 shows a block diagram of a prior art M-channel multi-beam ultrasound front end and beamformer system 100 that utilizes J active transducer elements and is capable of receiving N beams simultaneously. The signals from the active transducer elements are processed through a switching network 110 and applied to appropriate channel for further processing. Each channel includes a signal conditioning unit 120 (designated in the Figure as "Pre-condition"), a digitizing unit 130, and N delay/apodization units 140a–140n ("delay units"). Each channel also includes N two-input summing units (or adders). The switching network 110 receives an ultrasound signal from each of the ultrasound transducers and selectively directs the signals to the signal processing elements. The switching network 110 allows the system to have fewer processing channels than transducers, so that a set of processing channels can sequentially process signals of transducers from multiple regions of the transducer array.

In each channel, the Pre-condition unit 120 receives an analog signal from the switching network 110 and filters or conditions that signal. The output signal generated by the Pre-condition unit is sampled or digitized by the digitizing unit 130, and the resulting digital samples are applied to each of the delay units 140a–140n. In each of the channels two through M, the output signal generated by the (k)th delay unit 140 of the channel is applied to the first input of the (k)th adder 150 of the channel for all k from one to N while the second input of the (k)th adder of the channel is coupled to receive the output signal generated by the (k)th delay unit in the previous adjacent channel. Thus, in the (j)th channel, the second input of the (k)th adder is coupled to receive the output signal generated by the nth adder in the (j−1)th channel, for all channels from two to M, and for all beams from one to N. In the (j)th channel, the (k)th adder generates an output signal representative of the (k)th received beam, for all beams from one to N. All channels utilize an identical architecture; however, since the first channel has no previous channel's output available, the output of the delay units of the first channel are each added to a value equivalent to a zero or null signal level.

The group of M delay units formed by summing the (k)th delay unit from each of the M channels constitutes a "beam former" for controlling the receive angle of the nth beam, so the system uses N beam formers to control the reception of the N beams. The adders in the channels thus form N summing trees. The (k)th summing tree sums the output signals generated by the (k)th beam former in all of the M channels, for all n beams from one to N.

Figure 2A:
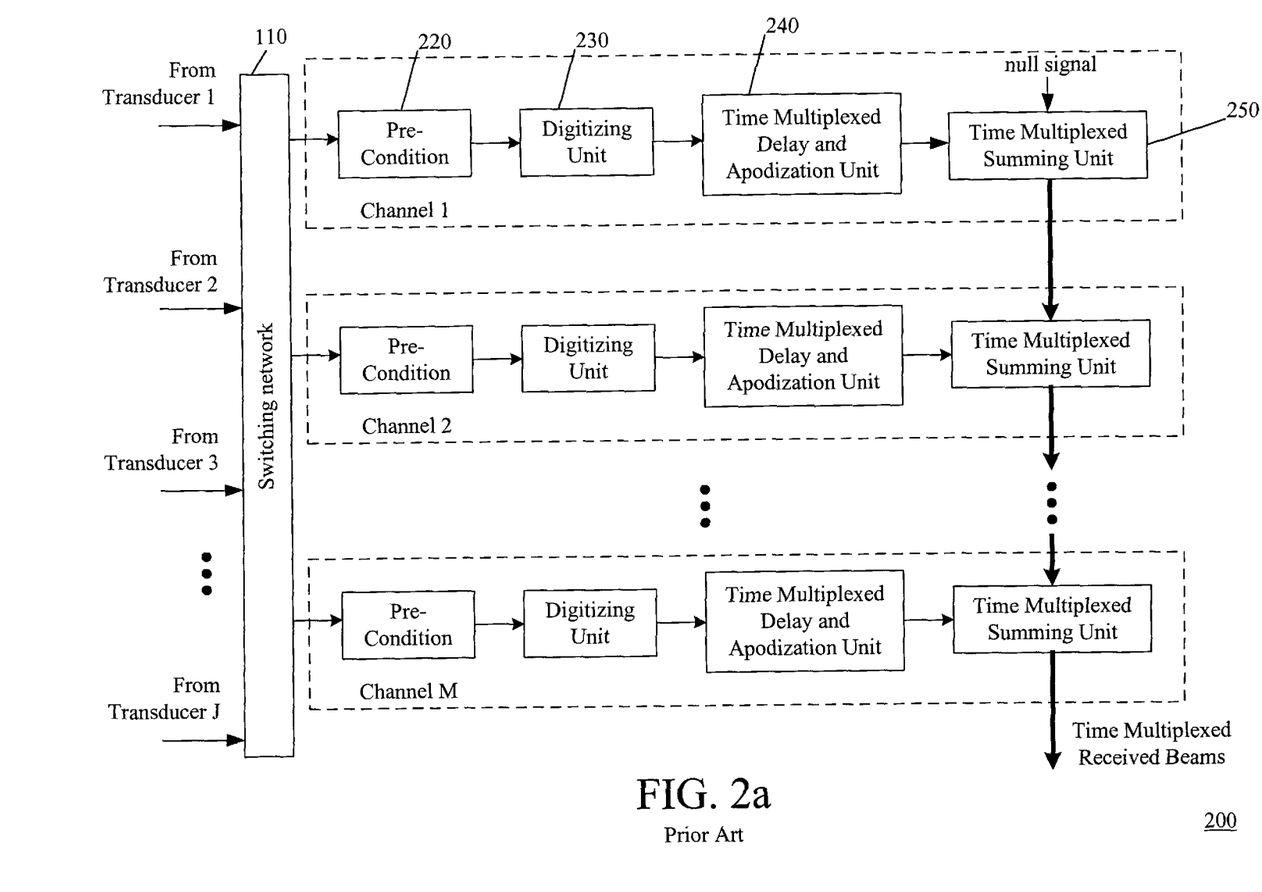
FIG. 2a is a diagrammatic view of another prior art ultrasound beamformer for use in an ultrasound imaging system which uses a plurality of time multiplexed summing units.
Figure 2B:
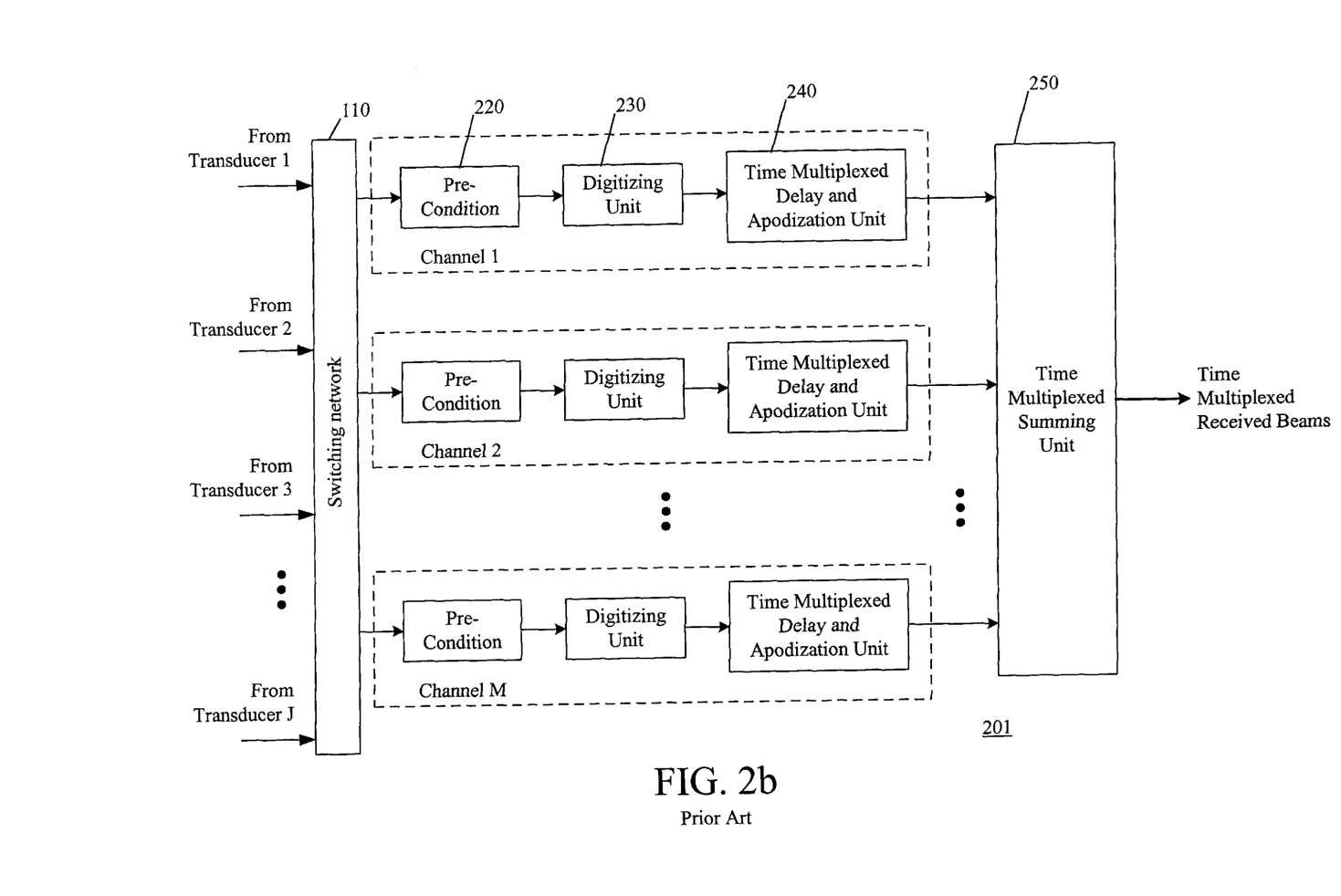
FIG. 2b is a diagrammatic view of a prior art ultrasound beamformer similar to that shown in FIG. 2a which includes a parallel time multiplexed summing unit instead a plurality of individual time multiplexed summing units.

FIGS. 2a and 2b show a block diagram of the system 200, 201 described in U.S. Pat. No. 5,469,851, issued Nov. 28, 1995 to Lipschutz (hereinafter referred to as the '851 patent). This system achieves the same result as the system shown in FIG. 1 but with fewer components. In addition to a pre-condition unit 220 and a digitizing unit 230, each channel includes a single Time Division Multiplexed bus (hereinafter referred to as the TDM bus) and a single TDM Delay and Apodization Unit 240, and rather than including (M×N) adders, channels one through M each include a single TDM Summing Unit 250. In each channel, the TDM Delay and Apodization Unit 240 effectively replaces the N delay units 140 included in the FIG. 1 system when the processing means of the N delay units included in the system of FIG. 1 are used for only 1/N of their processing rate. The TDM summing units 250 are synchronized with the TDM delay units 240, so that the TDM summing unit 250 in the Mth channel generates a summed. TDM output signal that is representative of all N received beams. Replacing the N beam formers of (FIG. 1, which are only partially used at any one time) with a single TDM beam former of FIG. 2 (fully utilized) in this fashion decreases the number of hardware components required to implement the system and significantly decreases the cost of the system.

FIG. 2b shows a block diagram of an alternative system 201 having a different architecture than the one shown in FIG. 2a. Instead of including a TDM summing unit in each of channels one through M and summing the channels in series, a single parallel TDM summing unit 250 accepts all M TDM outputs and generates a TDM output signal that is representative of all N received beams. In one embodiment of this prior art device, the system includes 128 channels which are divided into 8 groups of 16 channels. Each group of 16 channels is configured to include 16 TDM Summing Units as shown in FIG. 2a to produce 8 separate TDM beam sums. The 8 TDM beam sums are combined by single TDM parallel summing unit similar to the system shown in FIG. 2b.

TDM systems such as the one exemplified by the '851 patent produce a TDM data stream at a data rate directly proportional to the number of beams being processed. In these systems, low data rates are desirable at the circuit interface between the summing units and the image processing system because the detrimental, frequency dependent effects associated with design and fabrication become more pronounced at higher frequencies. Efforts to mitigate these effects often result in higher production costs.

Accordingly, it is an object of this invention to provide an improved ultrasound. beamformer for processing received signals from an ultrasound transducer array.

It is another object of this invention to provide an improved ultrasound beamformer for processing received signals from an ultrasound transducer array which converts a stream of delayed time multiplexed samples into separate streams of samples corresponding to two or more beams.

It is yet another object of this invention to provide an improved ultrasound beamformer for processing received signals from an ultrasound transducer array which converts a stream of delayed time multiplexed samples into separate streams of samples corresponding to two or more beams in which the data rate of the separate streams is one half the data rate of the time multiplexed samples.

It is a further object of this invention to provide an improved ultrasound beamformer for processing received signals from an ultrasound transducer array which converts a stream of delayed time multiplexed samples into separate streams of samples corresponding to two or more beams in which the data rate of the separate streams is twice the data rate of the received signals.

SUMMARY OF THE INVENTION

The present invention is directed to a system for processing ultrasound signals such as those reflected from a medium to be imaged, for example the human body, using an active ultrasound transducer array. Through the use of beam steering and focusing, ultrasound energy can be used to produce images representing certain characteristics of the medium. Beam steering and focusing of the transmitted energy is accomplished by applying predetermined time delays to transmitted pulses produced by each element of an ultrasound transducer array. Beam steering and focusing of the received energy is accomplished in a similar fashion, using time delays in the received signal processing to arrange and coordinate the reflected signals received from the medium.

In accordance with the invention, a system is disclosed for processing signals received from an ultrasound transducer array. The system includes a plurality of processing channels and each channel is associated via a switching network with a transducer of the transducer array for processing the signals from that transducer element. The switching network allows the system to selectively couple different elements to a particular channel, so that M processing channels may be used to sequentially process the entire array of J transducer elements when M is less than J. Each channel can include a preconditioning unit for conditioning the signal in order to adjust the gain of the signal, limit the signal and/or provide proper filtering of the signal. Each channel can also include a digitizing unit for sampling the conditioned signal received from the preconditioning unit and for producing digitized samples of the conditioned signal. Each channel can also include a time multiplexed delay and apodization unit for arranging each of the digital samples into first signals including a stream of delayed time multiplexed digital samples for forming one or more beams.

In accordance with one embodiment of the invention, if the first signals include delayed time multiplexed digital samples for forming only one beam, each channel can also include a demultiplexing unit for demultiplexing the first signals into a plurality of streams of delayed digital samples, such that each stream corresponds to some portion of the digital samples from the first stream. For example, the first signals may be demultiplexed into two streams, a high order stream and a low order stream, such that the high order stream includes the most significant half of each digital sample in the first signal stream, and the low order stream includes the least significant half of each digital sample in the first signal stream. The system can further include a plurality of summing units for summing each of the corresponding streams of the signals from each of the processing channels to produce a plurality of summed signals, wherein each stream corresponds to some portion of a data stream representative of a single beam.

In accordance with another embodiment of the invention, if the first signals include delayed time multiplexed digital samples for forming more than one beam, each channel can also include a beam demultiplexing unit for demultiplexing the first signals into a plurality of streams of delayed digital samples, wherein each stream corresponds to a data stream representing a single beam. The system can further include a plurality of summing units for summing each of the corresponding streams of the second signals from each of the processing channels to produce a plurality of streams of summed signals, wherein each stream corresponds to a data stream representative of a single beam.

The summed signals from either of the embodiments above can be input into a bus interface unit for connecting the system to an external data bus, such as that of a general purpose computer system. The general purpose computer system can further process the beam data to produce video images representing certain characteristics of the medium scanned.

In accordance with an alternative embodiment of the present invention, the same system can process signals for producing one, two or four beams received at different frequencies. By multiplexing or demultiplexing the signals, the maximum data rate and bus width of the summed signals can be the same regardless of whether the beamformer is in a one, two or four beam configuration. Thus, the output for one, two or four beams can be interfaced with an external data bus of a general purpose computer system with an appropriate data throughput.

BRIEF DESCRIPTION OF THE DRAWINGS

The foregoing and other objects of this invention, the various features thereof, as well as the invention itself, may be more fully understood from the following description, when read together with the accompanying drawings in which.

DETAILED DESCRIPTION OF THE PREFERRED EMBODIMENTS

The preferred embodiment of present invention is directed to a transducer array ultrasound imaging system for producing images representing cross sections through the human body. This technology is used, for example, in the field of medicine to diagnose and treat patients. This is accomplished by producing and applying a beam of ultrasound energy to the portion of the body to be diagnosed or treated and measuring the ultrasonic energy reflected from the portion of body to which the beam was applied. By processing multiple beams simultaneously, various advantages can be realized.

Figure 3:
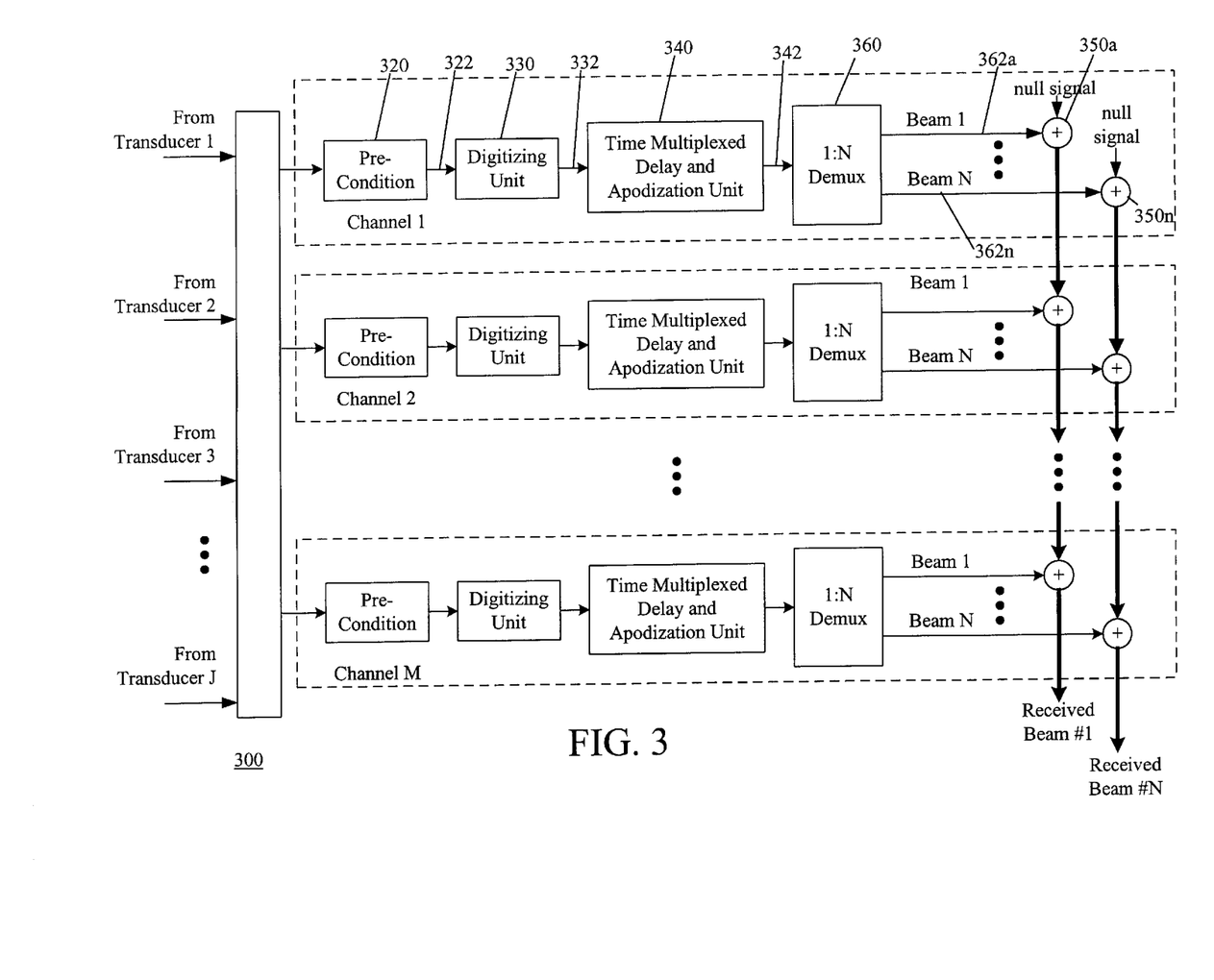
FIG. 3 is a diagrammatic view of an ultrasound beamformer in accordance with the present invention.

FIG. 3 shows a simplified block diagram of an ultrasound beamformer 300 in accordance with the present invention. The ultrasound beamformer 300 includes a plurality of channels, each channel being adapted to receive a signal through switching network 310 from an active ultrasound transducer of a transducer array during signal processing time. Each of the transducer elements functions both as a transmitter and receiver and produces a pulse of ultrasound energy that is applied to the medium being scanned. The magnitude of the pulse and time delay of the pulse relative to the other transducers are controlled in order to produce a beam by focusing the energy at a particular point in the medium.

The ultrasound transducers are organized in an array which can transmit and receive ultrasound energy along a plurality of scan lines. The data produced by various scan patterns can be processed using known techniques to produce an ultrasound image of the medium being scanned.

In accordance with one embodiment of the invention, each channel includes a preconditioning unit 320 for conditioning the signal received from a transducer in order to prepare the signal on line 322 to be digitized by digitizing unit 330. The preconditioning unit can include elements that perform dynamic gain control and equalization functions, signal limiting functions and/or signal filtering functions to remove noise and other undesirable components.

In the preferred embodiment, the preconditioned signal is fed into a digitizing unit 330, such as an analog to digital converter which produces a stream of digitized samples or data units on line 332 which in turn correspond to the ultrasound energy received by the transducer respectively at specific points in time. The digitizing unit 330, samples the preconditioned signal on line 322 at the proper rate for the signal being digitized. In the one embodiment, the sampling rates $f_S$ of the digitizing unit are 40 MHz, 20 MHz and 10 MHz for a 1 beam, 2 beam and 4 beam beamformer respectively.

In each processing channel, the stream of digital samples is processed by a time multiplexed delay and apodization unit 340 to produce a stream of delayed, time division multiplexed (TDM) samples on line 342. Multiple beams from a stream of samples are formed by applying, in sequence, multiple delay and apodization parameters to each sample of the stream. Thus, in a beamformer system configured to form four beams, each sample is processed in sequence first to form the first receive beam, then to form the second receive beam, then to form the third receive beam, and finally to form the fourth receive beam. The process then repeats for the next sample. The processing of the data of the four beams is thus accomplished by the same circuit of the beamformer, multiplexed in time. Typically, the different beams have different focal points or different angles with respect to the transducer. As is well known in the art, the general equation for the delay and apodization required is a function of the physical position of each transducer element in the ultrasound array, the angle of the receive beam and the distance from the focal point to each transducer element.

As shown in FIG. 3, the stream of delayed TDM samples on line 342, which samples represent N beams are demultiplexed by demultiplexer 360 to form N streams of delayed samples on the respective lines 362a–362n, each stream corresponding to a beam. Each of the streams corresponding to a particular beam from each of the channels is summed by summing elements 350a–350n. The values produced represent the time synchronized summation of the received signal strengths for each of the N beams.

Figure 4A:
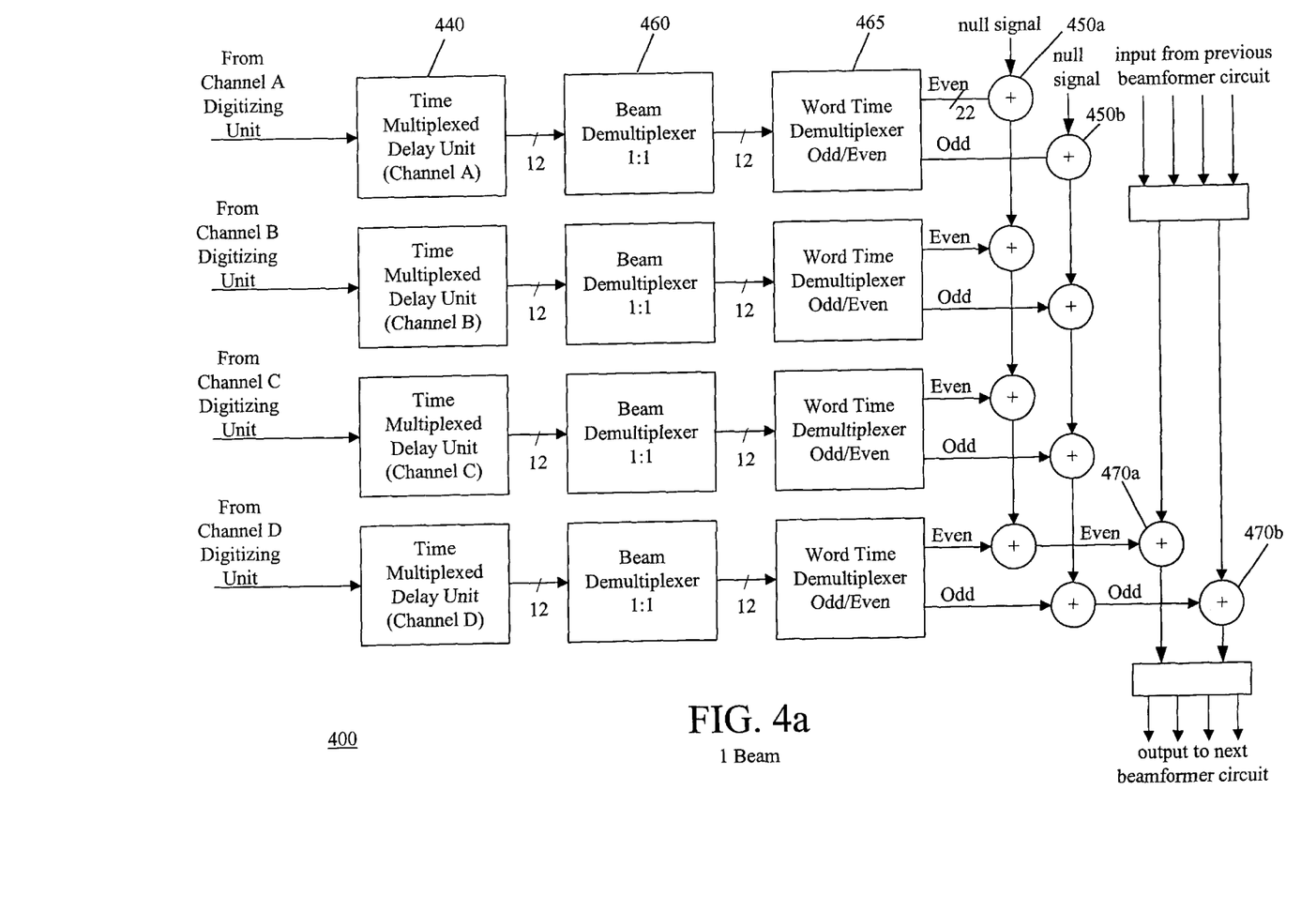
FIG. 4a is a diagrammatic view of a four channel beamformer circuit configured to form a single beam, in accordance with one embodiment of the present invention.

FIG. 4a shows a a four channel beamformer circuit configured to form a single beam in accordance with the preferred embodiment of the invention. In this embodiment, the sampling rate $f_S$ of the digitizing unit of each channel is 40 MHz and the digitizing unit produces 10 bit samples at a 40 MHz data rate. The time multiplexed delay unit of each channel 440, which performs the TDM delay and apodization functions, receives each 10 bit digital sample and produces a stream of 12 bit delayed, TDM samples, also at a 40 MHz data rate. In this embodiment, the delayed TDM stream is processed by a Beam Demultiplexer 460. However since there is only one beam, no demultiplexing function is performed. In an alternative embodiment, the Beam Demultiplexer 460 can be bypassed or simply not present. The 40 MHz delayed TDM stream is received by a Word Time Demultiplexer 465 which demultiplexes the single beam TDM stream into two streams of a number of bits higher than 12 to accommodate for increased dynamic range of the result of the summation of the data of the four channels. Each of the two streams contain a portion of the original stream at one half of the original rate. Preferably, one stream contains the odd data units or words and the other stream contains the even data units or words. Each of the streams corresponding to a particular portion of a beam, in this embodiment, the odd and even streams, from each of the channels is summed by summing elements 450a and 450b. The values produced represent the time synchronized summation of the received signal strengths for one half of the beam. The even and the odd words resulting from the summation of the data of the four channels of the beamformer circuit are then summed in the adder 470a and 470b with the corresponding words that are the summation of data of the previous (in the data path) four channel beamformer circuit and the result is output to the subsequent (in the data path) four channel beamformer circuit.

Figure 4B:
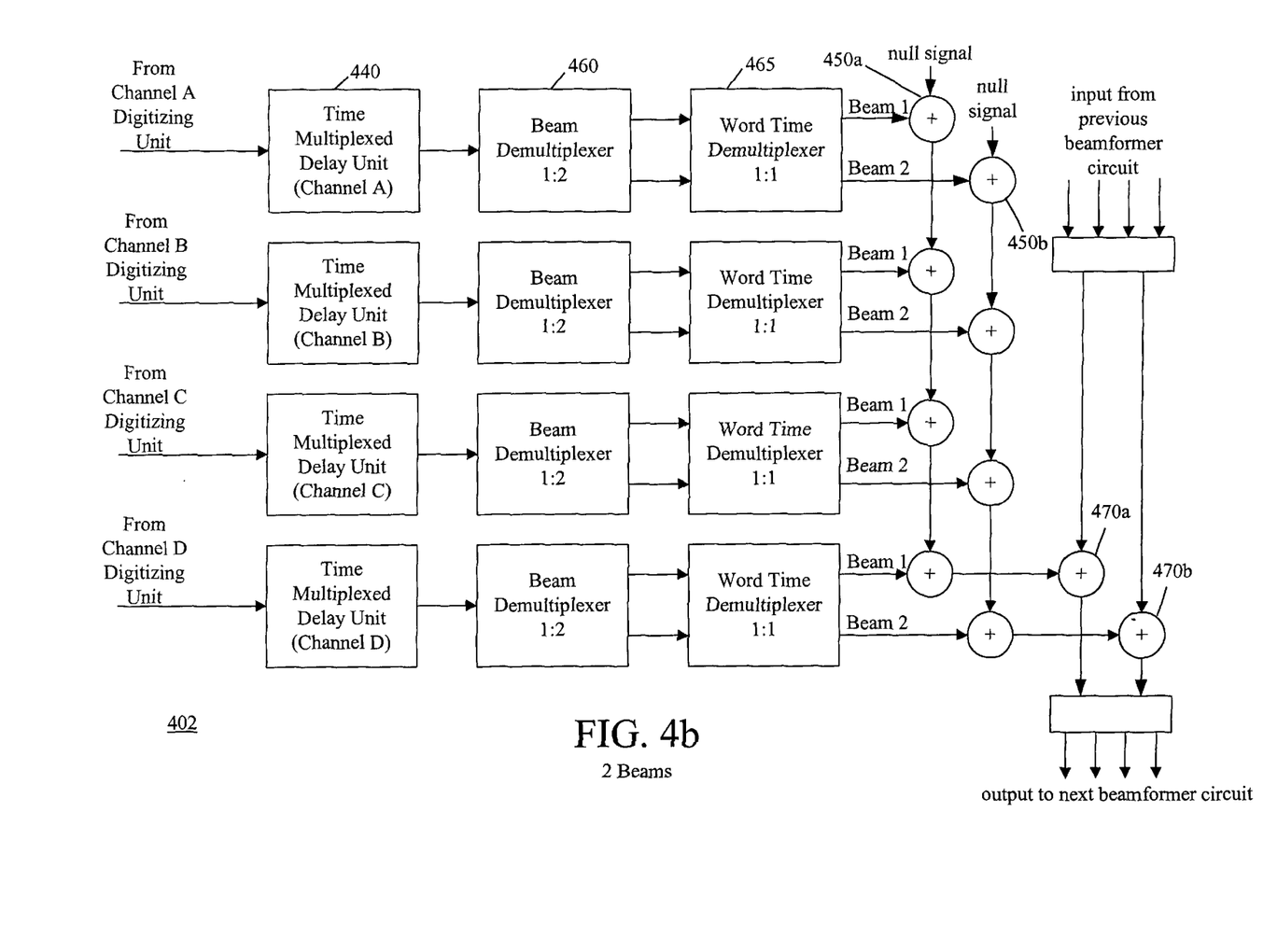
FIG. 4b is a diagrammatic view of a four channel beamformer circuit configured to form two beams, in accordance with an alternative embodiment of the present invention.

FIG. 4b shows a four channel beamformer circuit configured to form two beams in accordance with the preferred embodiment of the invention. In this embodiment, the sampling rate $f_S$ of the digitizing unit of each channel is 20 MHz and the digitizing unit provides 10 bit samples at a 20 MHz data rate. The time multiplexed delay unit of each channel 440, which performs the TDM delay and apodization functions, receives the 10 bit, 20 MHz sample stream and produces two interleaved streams of 12 bit processed samples, delayed and apodized so as to form two distinct beams. The processed samples of each of two interleaved streams are generated at 20 MHz, so that the TDM Delay and Apodization Circuit 440 generates processed words at a rate of 40 MHz. In this embodiment, the output of Delay and Apodization Circuit 440 is processed by a Beam Demultiplexer 460, which demultiplexes the stream to produce two delayed streams, each corresponding to one of the two beams. Each of the demultiplexed streams contains a delayed TDM stream whose samples have a rate of 20 MHz and a number of bits higher than 12 to accommodate for the increased dynamic range of the result of the summation of the data of the four channels. Each of the 20 MHz delayed TDM stream is received by a Word Time Demultiplexer 465 which is disabled and merely passes each of the demultiplexed, delayed, TDM streams to the summing units 450a and 450b. In an alternative embodiment the Word Time Demultiplexer 465 can be by-passed or eliminated from the circuit architecture. Each of the streams corresponding to a particular beam, from each of the channels is summed by summing elements 450a and 450b. The values produced represent the time synchronized summation of the received signal strengths for each beam. The first beam data words and the second beam data words resulting from the summation of the data of the four channels of the beamformer circuit are then summed in the adder 450a and 450b with the corresponding words that are the summation of data of the other four channel beamformer circuit and the result is output to another four channel beamformer circuit.

Figure 4C:
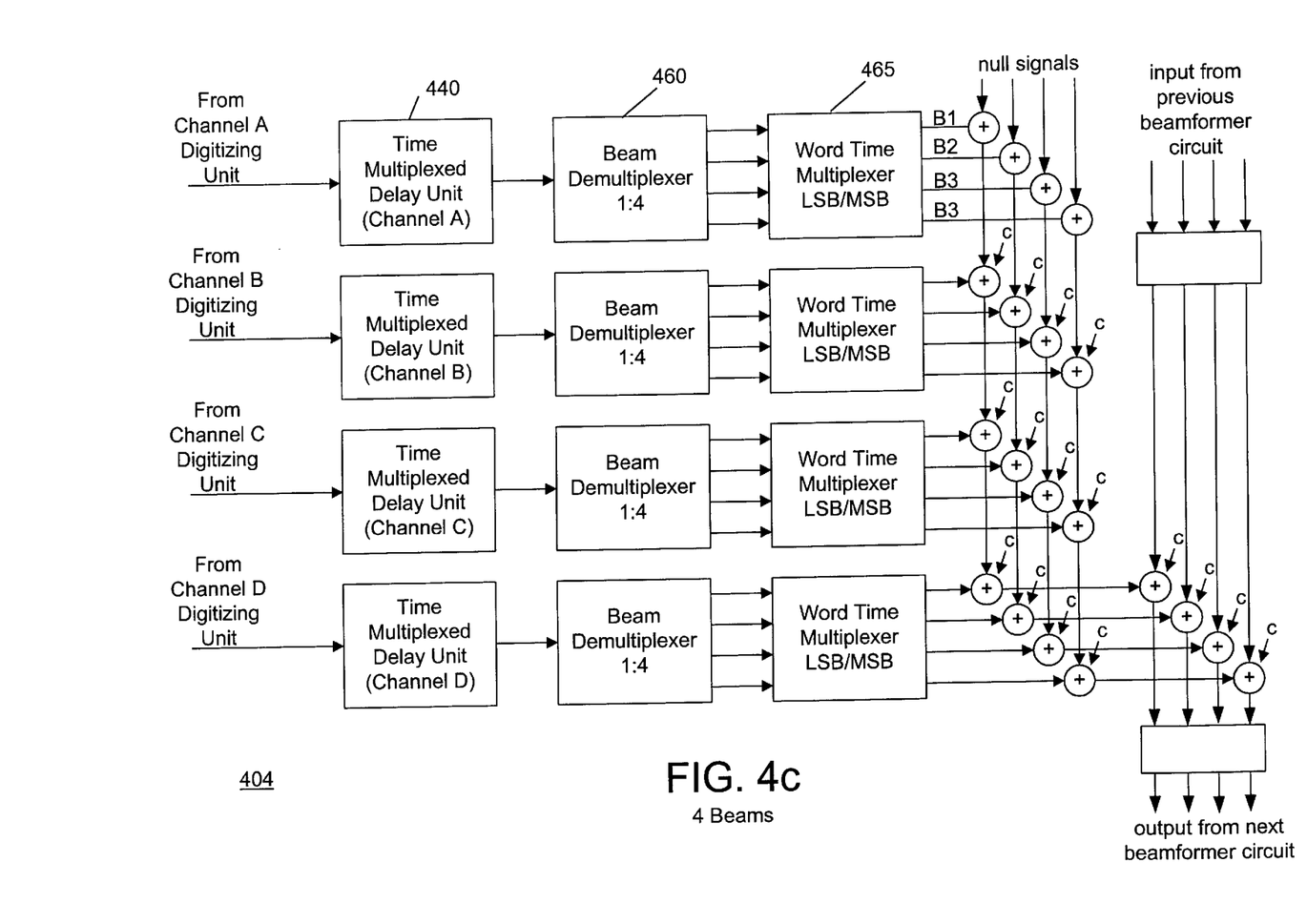
FIG. 4c is a diagrammatic view of a four channel beamformer circuit configured to form four beams, in accordance with an alternative embodiment of the present invention.

FIG. 4c shows a four channel beamformer circuit configured to form four beams, in accordance with the preferred embodiment of the invention. In this embodiment, the sampling rate of the digitizing unit of each channel, $f_S$ is 10 MHz and the digitizing unit provides 10 bit samples at a 10 MHz data rate. The time multiplexed delay unit of each channel 440, which performs the TDM delay and apodization functions, receives the 10 bit, 10 MHz sample stream and produces four interleaved streams of 12 bit processed samples, delayed and apodized so as to form four distinct beams. The processed samples of each of four interleaved streams are generated at 10 MHz, so that the TDM Delay and Apodization Circuit 440 generates processed words at a rate of 40 MHz. In this embodiment, the output of TDM Delay and Apodization Circuit 440 is processed by a Beam Demultiplexer 460, which demultiplexes the stream to produce four delayed streams, each corresponding to one of the four beams. Each of the demultiplexed streams contains a delayed TDM stream whose samples have a rate of 10 MHz and a number of bits higher than 12 to accommodate for the increased dynamic range of the result of the summation of the data of the four channels. Each of the 10 MHz delayed TDM streams is received by a Word Time Multiplexer 465 which divides each processed sample into two portions and multiplexes the portion containing least significant bits (LSB) and portion containing the most significant bits (MSB) to produce a new TDM stream. Each of the streams corresponding to a particular beam, from each of the channels is summed by summing elements 450a, 450b, 450c, 450d. The values produced represent the time synchronized summation of the received signal strengths for each beam. The first beam data words, the second beam data words, the third beam data words and the fourth beam data words resulting from the summation of the data of the four channels of the beamformer circuit are then summed in adders with the corresponding words that are the summation of data of the other four channel beamformer circuit and the result is output to another four channel beamformer circuit.

The invention may be embodied in other specific forms without departing from the spirit or essential characteristics thereof. The present embodiments are therefore to be considered in respects as illustrative and not restrictive, the scope of the invention being indicated by the appended claims rather than by the foregoing description, and all changes which come within the meaning and range of the equivalency of the claims are therefore intended to be embraced therein.

What is claimed is:

1. An ultrasound beamformer for processing digital samples representative of the signals received by the transducer elements of an ultrasound transducer array, the beamformer comprising:

a plurality of processing channels, each processing channel constructed and arranged so as to process the digital samples representative of signals received from an element of the transducer aiTay and each channel including:

time multiplexed delay means for delaying said digital samples by time multiplexed delays so as to produce a stream of delayed time multiplexed digital samples representative of data associated with at least two beams; and demultiplexing means for demultiplexing said stream of delayed time multiplexed digital samples so as to produce a plurality of streams of demultiplexed delayed digital samples, wherein each stream of demultiplexed delayed digital samples corresponds to data associated with only one of said beams; and summing means for summing the streams of demultiplexed delayed digital samples for each of the beams from each of said processing channels that are associated with the same beam so as to produce a plurality of streams of summed digital samples, wherein each stream of summed digital samples is representative of data associated with a corresponding one of said beams.

2. An ultrasound beamformer according to claim 1, further comprising:

interface means for interfacing said streams of summed digital samples to an external data bus.

3. An ultrasound beamformer according to claim 1, wherein:

said delayed time multiplexed digital samples are transmitted at a first data rate and said summed digital samples are transmitted at a second data rate, and wherein said second data rate is one half of said first data rate.

4. An ultrasound beamformer according to claim 1, wherein:

said delayed time multiplexed digital samples are transmitted at a first data rate and said summed digital samples are transmitted at a second data rate, and wherein said second data rate is twice said first data rate.

5. An ultrasound beamformer for processing digital samples representative of signals received by the transducer elements of an ultrasound transducer array, the beamformer comprising:

a plurality of processing channels, each channel constructed and arranged so as to process the digital samples representative of signals received from an element of the transducer array and each channel including:

time multiplexed delay means for delaying said digital samples by time multiplexed delays so as to produce a stream of delayed time multiplexed digital samples representative of data associated with a single beam; and beam demultiplexing means for demultiplexing said stream of delayed time multiplexed digital samples so as to produce a plurality of streams of demultiplexed delayed digital samples, wherein each stream of demultiplexed delayed digital samples corresponds to data associated with only a portion of a data stream representative of the single beam; and summing means for summing the streams of demultiplexed delayed digital samples from each of said processing channels that are associated with the same portion of said beam so as to produce a plurality of streams of summed digital samples, wherein each stream of summed digital samples is representative of data associated with a corresponding portion of the single beam.

6. An ultrasound beamformer according to claim 5, further comprising:

interface means for interfacing said each stream of summed digital samples to an external data bus.

7. An ultrasound beamformer according to claim 5, wherein:

said delayed time multiplexed digital samples are transmitted at a first data rate and said summed digital samples are transmitted at a second data rate, and wherein said second data rate is one half of said first data rate.

8. An ultrasound beamformer according to claim 5, wherein:

said delayed time multiplexed digital samples are transmitted at a first data rate and said summed digital samples are transmitted at a second data rate, and wherein said second data rate is twice said first data rate.

9. An ultrasound beamformer according to claim 5, wherein:

each stream of summed digital samples is representative of a corresponding predetermined number of significant bits of data associated with said single beam, so that at least one of the streams of summed digital samples is representative of the most significant bits of data and at least one other streams of summed digital samples is representative of the least significant bits of data.

10. An ultrasound imaging system for processing digital samples representative of signals received by the transducer elements of an ultrasound transducer array, said system including:

said ultrasound transducer array including the plurality of transducer elements;

a plurality of processing channels, each processing channel constructed and arranged so as to process the digital samples representative of signals received by a corresponding one the transducer elements, each processing channel comprising:

a time multiplexed delay constructed and arranged so as to receive a stream of the digital samples corresponding to the signals received by a corresponding transducer element and delay the stream of digital samples by time multiplexed delays so as to produce a stream of delayed time multiplexed digital samples representative of data associated with at least two beams;

a demultiplexer constructed and arranged so as to receive a stream of delayed time multiplexed digital samples and demultiplex the stream of delayed time multiplexed digital samples into a plurality of streams of demultiplexed delayed digital samples, wherein each stream of demultiplexed delayed digital samples corresponds to data associated with only one of said beams; and summing means for summing the streams of demultiplexed delayed digital samples for each of the beams from each of said processing channels that are associated with the same beam so as to produce a plurality of streams of summed digital samples, wherein each stream of summed digital samples is representative of data associated with a corresponding one of said beams.

11. An ultrasound imaging system according to claim 10, further comprising:

an interface constructed and arranged so as to provide an interface for streams of summed digital samples to an external data bus.

12. An ultrasound imaging system according to claim 10, wherein:

said delayed time multiplexed digital samples are transmitted at a first data rate and said summed digital samples are transmitted at a second data rate and wherein said second data rate is one half of said first data rate.

13. An ultrasound imaging system according to claim 10, wherein:

said delayed time multiplexed digital samples are transmitted at a first data rate and said summed digital samples are transmitted at a second data rate and wherein said second data rate is twice said first data rate.

14. An ultrasound imaging system for processing digital samples representative of signals received by the transducer elements of an ultrasound transducer array, said system including:

said ultrasound transducer array including the plurality of transducer elements;

a plurality of processing channels, each channel constructed and arranged so as to process the digital samples representative of signals received from an element of the transducer array and each channel including:

time multiplexed delay means for delaying said digital samples by time multiplexed delays so as to produce a stream of delayed time multiplexed digital samples representative of data associated with a single beam; and beam demultiplexing means for demultiplexing said stream of delayed time multiplexed digital samples so as to produce a plurality of stream of demultiplexed delayed digital samples, wherein each stream of demultiplexed delayed digital samples corresponds to data associated with only a portion of a data stream representative of the single beam; and summing means for summing the streams of demultiplexed delayed digital samples from each of said processing channels that are associated with the same portion of said beam so as to produce a plurality of streams of summed digital samples, wherein each stream of streamed digital samples is representative of data associated with a corresponding portion of the single beam.

15. An ultrasound imaging system according to claim 14, further comprising:

interface means constructed and arranged so as to provide an interface for the stream of summed digital samples to an external data bus.

16. An ultrasound imaging system according to claim 14, wherein:

said delayed time multiplexed digital samples are transmitted at a first data rate and said summed digital samples are transmitted at a second data rate and wherein said second data rate is one half of said first data rate.

17. An ultrasound imaging system according to claim 14, wherein:

said delayed the multiplexed digital samples are transmitted at a first data rate and said summed digital samples are transmitted at a second data rate and wherein said second data rate is twice said first data rate.

18. An ultrasound beamformer according to claim 14, wherein:

each stream of summed digital samples is representative of a corresponding predetermined number of significant bits of data associated with said single beam, so that at least one of the streams of summed digital samples is representative of the most significant bits of data and at least one other streams of summed digital samples is representative of the least significant bits of data.

* * * * *

UNITED STATES PATENT AND TRADEMARK OFFICE
CERTIFICATE OF CORRECTION

PATENT NO.: 5,905,692

DATED: May 18, 1999

INVENTOR(S): Enrico Dolazza, et al.

It is certified that errors appear in the above-identified patent and that said Letters Patent is hereby corrected as shown below:

Claim 1, column 8, line 53, delete "aiTay" and insert therefor -- array --.

Claim 14, column 11, line 31, delete "streamed" and insert therefor -- summed --.

Claim 17, column 12, line 16, delete "the" and insert therefor -- time --.

Signed and Sealed this

Eleventh Day of April, 2000

Q. TODD DICKINSON

*Attest:*

*Attesting Officer*  *Director of Patents and Trademarks*